US007853292B2

(12) United States Patent
Chang et al.

(10) Patent No.: US 7,853,292 B2
(45) Date of Patent: Dec. 14, 2010

(54) DISTRIBUTED RESOURCE MANAGEMENT FOR ENHANCED DEDICATED CHANNEL

(75) Inventors: Jiang Chang, Beijing (CN); Fang-Chen Cheng, Morris, NJ (US); Teck Hu, Morris, NJ (US); Jun Qiang Liu, Beijing (CN); Yifei Yuan, Kearny, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 154 days.

(21) Appl. No.: 10/840,756

(22) Filed: May 6, 2004

(65) Prior Publication Data

US 2006/0211375 A1   Sep. 21, 2006

(51) Int. Cl.
*H04M 1/00* (2006.01)
*H04B 1/38* (2006.01)
(52) U.S. Cl. .............. 455/561; 455/560; 455/67.11; 455/67.13; 455/436; 455/437; 455/438; 455/439; 455/450; 455/452.1; 455/452.2; 455/453; 370/250; 370/251; 370/252; 370/329; 370/330; 370/331; 370/332
(58) Field of Classification Search ......... 455/436–442, 455/446–448, 450–451, 452.1–452.2, 67.11–67.16, 455/560–561, 453, 68–69; 370/342, 348, 370/335–337, 329–330, 320–321, 333, 465, 370/461, 468, 331–332, 250–252
See application file for complete search history.

(56) References Cited

U.S. PATENT DOCUMENTS 5,396,645 A * 3/1995 Huff ........................... 455/441
5,822,699 A * 10/1998 Kotzin et al. ................. 455/447
5,956,642 A    9/1999 Larsson et al. ............... 455/449
6,298,233 B1 * 10/2001 Souissi et al. ................ 455/423
6,631,124 B1 * 10/2003 Koorapaty et al. ........... 370/337
6,907,243 B1 *  6/2005 Patel ........................... 455/442
6,987,738 B2 *  1/2006 Subramanian et al. ....... 370/252
7,061,898 B2 *  6/2006 Hashem et al. .............. 370/342
2002/0019231 A1 *  2/2002 Palenius et al. .............. 455/437
2002/0122403 A1    9/2002 Hashem et al. .............. 370/342
2003/0202490 A1 * 10/2003 Gunnarsson et al. ........ 370/332

FOREIGN PATENT DOCUMENTS

WO    WO 03/005752 A1    1/2003

OTHER PUBLICATIONS

Iacono, S. et al.: "Policy based management for next generation mobile networks" *Wireless Communications and Networking*, 2003WCNC 2003. 2003 IEEE Mar. 16-20, 2003.
European PCT Search Report EP 05 25 2541 dated Jan. 27, 2006.

* cited by examiner

*Primary Examiner*—Tuan A Tran
(74) *Attorney, Agent, or Firm*—Williams, Morgan & Amerson

(57) ABSTRACT

The present invention provides methods for distributed resource management for enhanced dedicated channel. One method of communication with at least one base station includes determining at least one short-term entity associated with the at least one base station and providing the at least one short-term entity to a radio network controller. Another method includes receiving at least one short-term entity associated with the at least one base station and allocating at least one long-term resource based upon the at least one short-term entity.

17 Claims, 2 Drawing Sheets

DISTRIBUTED RESOURCE MANAGEMENT FOR ENHANCED DEDICATED CHANNEL

BACKGROUND OF THE INVENTION

1. Field of the Invention

This invention relates generally to telecommunications, and, more particularly, to wireless telecommunications.

2. Description of the Related Art

A conventional wireless telecommunications system, such as a cellular telephone system, includes one or more base stations (sometimes referred to as node-Bs) that may establish and/or maintain one or more concurrent wireless communication links with one or more mobile units. For example, a base station may establish and/or maintain concurrent wireless communication links with a plurality of mobile units within a cell associated with the base station. The mobile units may be cellular telephones, pagers, personal data assistants, portable computers, desktop computers, and the like.

A radio network controller may be coupled to the one or more base stations. Among other functions, the radio network controller manages resources for an uplink dedicated channel used by each mobile unit associated with each of the base stations. For example, the radio network controller may include a resource management function that controls the interference from other mobile units in the cell, as well as handover mobile units in neighboring cells, so that a required quality of service (sometimes referred to as a QoS) is satisfied for each mobile unit. As of Release 99 of the Universal Mobile Telephone Service (UMTS) protocol, allocation and coordination of dedicated channel resources between all of the base stations is carried out by the radio network controller.

The radio network controller performs the various resource management functions based upon a long-term entity such as a long-term average of the Received Total Wideband Power or Received Signal Strength Indicator, which are absolute measures of the aggregate received power. The long-term entity is typically used to determine a measure of the relative contribution of thermal noise and interference from other mobile units called the "rise-over-thermal," or RoT. The radio network controller may use the rise-over-thermal to allocate the resources of the base stations such that a desired quality of service may be maintained for each mobile unit. For example, the radio network controller may use the rise-over-thermal to administrate the total number of the users in the system and the system load of the base stations so that a frame error rate for each mobile unit may be kept below a desired level or in a desired range. For another example, the radio network controller may use the rise-over-thermal to administrate the total number of the users and the system load of the base stations so that a signal-to-noise ratio for each mobile unit may be kept above a desired level or in a desired range.

However, the radio network controller requires additional headroom with an assumption of a worst case scenario to perform the resource management functions, which reduces the efficiency of the wireless telecommunications system. For example, the radio network controller may account for silences in voice communication, such as pauses in a conversation, by assuming a worst-case scenario in which all mobile units are assumed to be transmitting and/or receiving voice communications during silences. The additional headroom is, at least in part, a result of the radio network controller performing the various resource management functions based upon long-term variables, such as the long-term average of the Received Total Wideband Power or Received Signal Strength Indicator. Nevertheless, it is desirable to have the radio network controller perform at least some resource management functions, particularly resource management functions that involve more than one base station, such as call admission and handover control.

The present invention is directed to addressing the effects of one or more of the problems set forth above.

SUMMARY OF THE INVENTION

In one embodiment of the present invention, a method is provided for distributed resource management for enhanced dedicated channel. The method includes determining at least one short-term entity associated with the at least one base station and providing the at least one short-term entity to a radio network controller. In another embodiment of the present invention, a method a method is provided for distributed resource management for enhanced dedicated channel that includes receiving at least one short-term entity associated with the at least one base station and allocating at least one long-term resource based upon the at least one short-term entity.

BRIEF DESCRIPTION OF THE DRAWINGS

The invention may be understood by reference to the following description taken in conjunction with the accompanying drawings, in which like reference numerals identify like elements, and in which.

Figure 1:
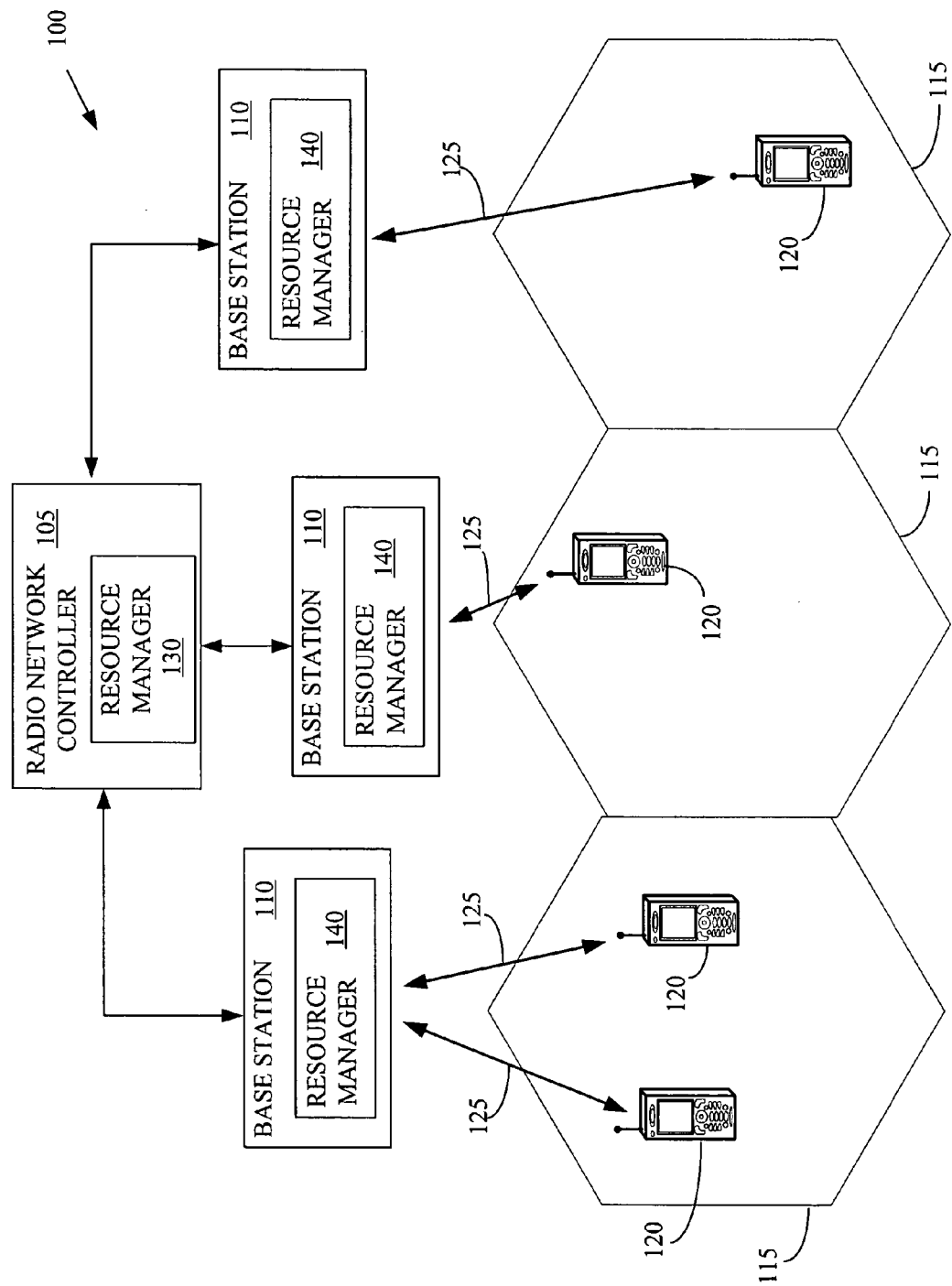
FIG. 1 conceptually illustrates one embodiment of a wireless telecommunications system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 conceptually illustrates one embodiment of a wireless telecommunications system 100. In the illustrated embodiment, the wireless telecommunications system 100 is a cellular wireless telecommunications system 100 that operates in accordance with the Universal Mobile Telecommunication System (UMTS) protocol. However, the present invention is not limited to cellular systems that operate in accordance with the UMTS protocol. In alternative embodiments, the wireless telecommunications system 100 may be any desirable system that operates in accordance with any desirable protocol including, but not limited to, a code division multiple access (CDMA) 2000 protocol, a Personal Communication System (PCS) protocol, a GSM protocol, and wireless LAN protocol.

The wireless telecommunications system 100 includes a radio network controller 105 that is communicatively coupled to one or more base stations 110. In alternative embodiments, the radio network controller 105 may be communicatively coupled to the one or more base stations 110 by any of a variety of wired and/or wireless links. Moreover, signals passed between the radio network controller 105 and the one or more base stations 110 may pass through other devices (not shown). For example, the signals may pass through one or more routers, switches, networks, and the like.

Each base station 110 is associated with at least one cell 115. For example, each base station 110 may be associated with a cell 115 corresponding to a geographic area having a radius of approximately 2 miles. However, persons of ordinary skill in the art should appreciate that the size of the cells 115 depends upon a variety of factors including, but not limited to, the transmission and/or reception power of the base station 110, the presence of obstructions such as buildings and/or mountains, and the like. Moreover, persons of ordinary skill in the art should appreciate that the cells 115 may not have a simple geometric shape, such as a hexagon, and boundaries of the cells 115 are not generally precisely defined, although in the interest of clarity the cells 115 shown in FIG. 1 are depicted as hexagons having precise boundaries.

In operation, the mobile units 120 establish concurrent wireless communication links 125 with at least the base station 110 associated with the cell 115 containing the mobile unit 120. In one embodiment, the concurrent wireless communication links 125 include an uplink dedicated channel (sometimes referred to as an uplink DCH). The base stations 110 provide signals indicative of a long-term allocation of resources associated with the base stations 110 to the radio network controller 105. In one embodiment, the signals indicative of the long-term allocation of resources include a long-term average of the Received Total Wideband Power or Received Signal Strength Indicator (RSSI).

A long-term resource management function 130 in the radio network controller 105 uses the signals indicative of a long-term allocation of resources to allocate resources associated with the radio network controller 105 and/or the base stations 110. For example, the long-term resource management function 130 may use the long-term average of the Received Total Wideband Power or RSSI to control call admission, handoff of the mobile units 120 between base stations 110, and the like. As used herein, the term "long-term" refers to resources that may be allocated on a relatively long timescale, such as call admission, handoff of the mobile units 120, system overload control, and the like. For example, the long-term allocation of resources may take place on a timescale of approximately 100 milliseconds to a few seconds.

A short-term resource management function 140 in the base station 110 allocates short-term resources. As used herein, the term "short-term" refers to resources that may be allocated on a relatively short time scale, such as the bandwidth allocated to voice and/or data communications. In one embodiment, voice and/or data communication bandwidth may be allocated to the mobile units 120 on a timescale of between about one-tenth of a millisecond and about ten milliseconds. For example, the relative bandwidth allocated to data communications may be increased when the required voice bandwidth decreases, i.e. during silences in the voice communication. In one embodiment, the efficiency of the wireless telecommunications system 100 may be improved by allowing the short-term resource management function 140 to allocate bandwidth to voice and/or data communications and other short-term resources. For example, the short-term resource management function 140 may reduce headroom by accounting for silences in voice communication, such as pauses in a conversation, using a statistical model of the mobile units 120 associated with the corresponding base station 110.

In one embodiment, an enhanced dedicated channel feature of the short-term resource management function 140 attempts to maximize capacity of the wireless telecommunications system 100 by dynamically controlling interference from mobile units 120 to approach a maximum tolerable level of a rise-over-thermal. However, efficiency of the operation of the resource management functions 130, 140 may be reduced if operation of the resource management functions 130, 140 is not coordinated. For example, if the short-term resource management function 140 dynamically controls interference from mobile units 120 to approach a maximum tolerable level of a rise-over-thermal, the long-term resource management function 130 may attempt to throttle traffic from the mobile units 120 to reduce the rise-over-thermal because the long-term resource management function 130 may interpret the large value of the rise-over-thermal as indicating that the wireless telecommunications system 100 may be near capacity and/or possibly overloaded.

Distributed resource allocation by the long-term and short-term resource management functions 130, 140 is coordinated by providing at least one feedback signal indicative of the short-term allocation performed by the short-term resource management function 140 to the long-term resource management function 130. In one embodiment, the feedback signal is indicative of one or more measurements of one or more short-term entities carried out at the one or more base stations 110. As will be discussed in detail below, the one or more measurements include a legacy uplink dedicated channel fraction of the Received Total Wideband Power, an average normalized received chip energy for the mobile units 120, an individual normalized received chip energy for each mobile unit 120, and the like.

Figure 2:
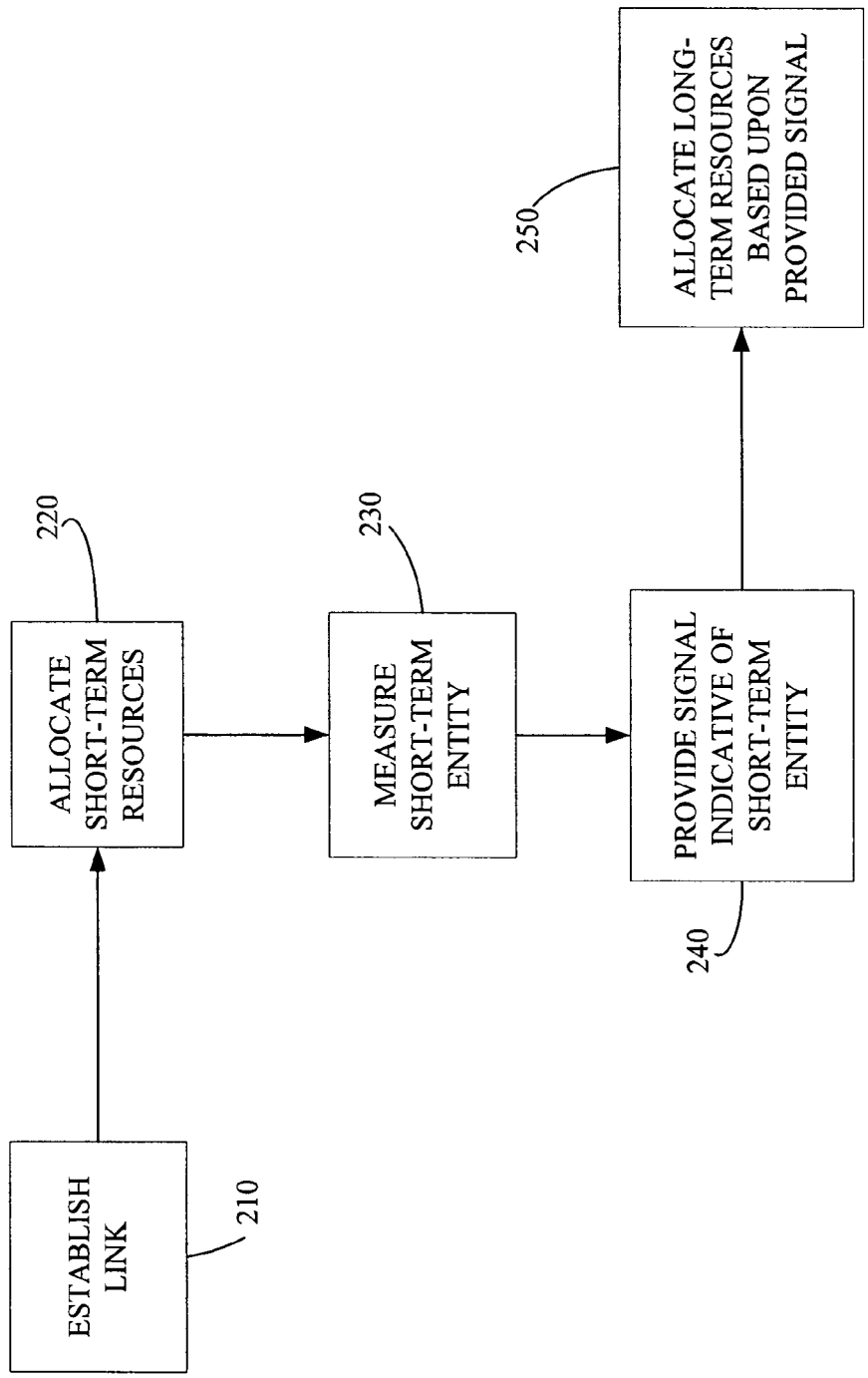
FIG. 2 conceptually illustrates one embodiment of a method of distributed resource management that may be used in the wireless telecommunications system shown in FIG. 1, in accordance with the present invention.

FIG. 2 conceptually illustrates one embodiment of a method 200 of distributed resource management that may be used in the wireless telecommunications system 100 shown in FIG. 1. A wireless communication link is established (at 210). As discussed above, the wireless communication link may be established (at 210) between one base station 110 and one mobile unit 120, between one base station 110 and a plurality of mobile units 120, between a plurality of base stations 110 and a plurality of mobile units 120, or any other desirable combination. One or more short-term resource management functions 140 allocate (at 220) short-term resources associated with the base stations 110 and/or the mobile units 120. In one embodiment, the short-term resources are allocated (at 220) on a timescale of between one to fifteen time slots (about 0.667 and ten milliseconds in UMTS). In one alternative embodiment, the short-term resources are allocated (at 220) on a timescale of between one to sixteen power control groups (about 1.25 ms to twenty milliseconds in CDMA2000).

One or more short-term entities associated with allocation (at 220) of the short-term resources are then measured (at 230). In one embodiment, measuring (at 230) the short-term entity includes measuring a legacy dedicated channel fraction of the Received Total Wideband Power. The legacy uplink dedicated channel allows the mobile units 120 to transmit at any data rate within a contracted Transport Format Combination Set (TFCS) with a guaranteed quality of service associated with a service class of the mobile unit 120. The data rate of the uplink dedicated channel may be determined by a traffic arrival rate and without any short-term control at a physical layer, i.e. by the short-term resource management function 140. The legacy uplink dedicated channel may use a large margin in the rise-over-thermal to allow the long-term resource management function 130 to account for a relatively large variation of interference from other mobile units 120. The legacy dedicated channel fraction of the uplink dedicated channel may therefore be used as a reference for the long-term measurement as the reference for the resource management 130 in the radio network controller 120 to allocate resources including call admission, system overload control, and the like.

Measuring (at 230) the short-term entity may also include measuring (at 230) an average normalized received chip energy associated with the mobile units 120. As mobile units 120 join and/or leave the wireless telecommunications system 100, data rate and/or time scheduling functions in the short-term resource management function 140 may allocate the data rate and/or scheduling of each mobile unit 120 to satisfy a short-term rise-over-thermal tolerance requirement. In some cases, the data rate adjustment and/or time scheduling may reach a saturation stage such that no additional mobile units 120 are allowed to join the wireless communications system 100. An indication that the saturation stage has been reached may be that the mobile units 120 have reached the lowest Transport Format Combination (TFC) in the rate scheduling mode and/or buffer overflow in the time scheduling mode. The measured (at 230) average normalized received chip energy for the mobile users 120 provides a reference to the long-term resource management function 130 that allows the long-term resource management function 130 to determine whether or not a new mobile unit 120 should be admitted to the wireless communication system 100.

Measuring (at 230) the short-term entity may also include measuring (at 230) an entity indicative of radio channel conditions associated with the mobile units 120. In one embodiment, individual normalized received chip energy associated with each of the mobile units 120 may be measured (at 230) as an indication of the radio channel conditions associated with each of the mobile units 120. The data rate and/or time scheduling modes of the short-term resource management function 140 allow each mobile unit 120 to be controlled in order to optimize throughput of the wireless telecommunications system 100. For example, data rates for mobile units 120 having poor radio channel conditions may be decreased and data rates for mobile units 120 having good radio channel conditions may be increased. In one embodiment, the individual normalized received chip energy is measured (at 230) as an indication of the radio channel condition. In one embodiment, the SIR (Signal to Interference Ratio) target may be used as the normalization factor. The indication of the radio channel conditions may be used by the long-term resource management function 130 to allocate long-term resources such as call admission.

The signal indicative of the measured short-term entities is provided (at 240) to the long-term resource management function 130 in the radio network controller 105. In various alternative embodiments, the provided (at 240) signal may be indicative of one or more of a legacy dedicated channel fraction of the Received Total Wideband Power or RSSI, an average normalized received chip energy, a radio channel condition, an individual normalized received chip energy, and the like. The long-term resource management function 130 allocates (at 250) long-term resources based upon the provided signal. For example, as discussed above, the long-term resource management function 130 may control call admission, system overload, handover, and the like using the provided signal. In one embodiment, the long-term resource management function 130 may also terminate one or more calls using the provided signal measurement output as the reference index. For example, the long-term resource management function 130 may terminate a wireless communication link associated with the mobile unit 120 based upon a poor radio channel condition, a system overload, insufficient radio resource for a user request to handoff, and the like.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:
performing, in at least one base station, at least one measurement of uplink signals from a plurality of mobile units;
determining, at said at least one base station, a plurality of short-term entities based on said at least one measurement, each short-term entity being associated with one of the mobile units, said at least one base station being configured to allocate short-term resources to each of the mobile units based on said short-term entity to approach a selected level of a rise-over-thermal caused by the mobile units;
determining, at said at least one base station, at least one long-term entity associated with the plurality of mobile units based on said at least one measurement; and
providing said short-term entities and said at least one long-term entity to a radio network controller that is configured to allocate long term resources based on said plurality of short-term entities and said at least one long-term entity.

2. The method of claim 1, wherein determining a plurality of short-term entities comprises determining at least one of a legacy dedicated channel fraction of a received total wideband power, a legacy dedicated channel fraction of a received signal strength indication, an average normalized received chip energy, a radio channel condition, and an individual normalized received chip energy.

3. The method of claim 1, comprising establishing at least one wireless communication link between at least one base station and at least one mobile unit.

4. The method of claim 3, wherein establishing the at least one wireless communication link comprises establishing at least one uplink dedicated channel between the at least one base station and the at least one mobile unit and modifying a data rate or time scheduling of the mobile units to satisfy a rise-over-thermal tolerance requirement.

5. The method of claim 1, comprising allocating said at least one short-term resource to account for silences in voice communication.

6. The method of claim 5, wherein allocating the at least one short-term resource comprises dynamically allocating at least one of a voice communication bandwidth and a data communication bandwidth so that the data communication bandwidth is increased when the voice communication bandwidth decreases and the data communication bandwidth is decreased when the voice communication bandwidth increases.

7. The method of claim 5, wherein allocating the at least one short-term resource comprises allocating the at least one short-term resource on a timescale of between one to fifteen time slots (about 0.667 and ten milliseconds in UMTS) or one to sixteen power control groups (about 1.25 ms to twenty milliseconds in CDMA2000).

8. The method of claim 5, wherein allocating the at least one short-term resource comprises allocating the at least one short-term resource to attempt to maximize capacity of a wireless telecommunications system by approaching a maximum tolerable level of the rise-over-thermal caused by the mobile units.

9. The method of claim 8, wherein allocating the at least one short-term resource comprises dynamically controlling interference from at least one of mobile unit to control the rise-over-thermal caused by the mobile units.

10. The method of claim 1, wherein determining said at least one long-term entity comprises determining at least one long-term entity indicating an aggregate power received from the plurality of mobile units.

11. A method, comprising:
receiving, at a network controller, a plurality of short-term entities associated with each of a plurality of mobile units and at least one long-term entity associated with the plurality of mobile units, the plurality of short-term entities and said at least one long term entity being determined based on at least one measurement of uplink signals from the mobile units performed by at least one base station, said at least one base station being configured to allocate short-term resources to each of the mobile units based on said short-term entity associated with a corresponding mobile unit to approach a selected level of a rise-over-thermal caused by the mobile units; and
allocating at least one long-term resource based upon the a plurality of short-term entities and said at least one long-term entity.

12. The method of claim 11, wherein receiving the at least one short-term entity comprises receiving at least one of a legacy dedicated channel fraction of a received total wideband power or received signal strength indication, an average normalized received chip energy, a radio channel condition, and an individual normalized received chip energy.

13. The method of claim 11, wherein allocating the at least one long-term resource comprises determining whether or not to admit a mobile unit depending on whether the short-term entity indicates that a saturation stage has been reached by said at least one base station.

14. The method of claim 11, wherein allocating the at least one long-term resource comprises allocating the at least one long-term resource on a timescale of approximately 100 milliseconds to a few seconds.

15. The method of claim 11, comprising terminating at least one wireless communication link between at least one base station and at least one mobile unit.

16. The method of claim 15, wherein terminating the at least one wireless communication link comprises terminating the at least one wireless communication link based upon at least one of a poor radio channel condition, a system overload, and a handoff.

17. The method of claim 11, wherein receiving said at least one long-term entity comprises receiving at least one long-term entity indicating an aggregate power received from the plurality of mobile units.

* * * * *